(12) United States Patent
Chene et al.

(10) Patent No.: US 8,181,900 B2
(45) Date of Patent: May 22, 2012

(54) ACOUSTIC COATING FOR AN AIRCRAFT INCORPORATING A FROST TREATMENT SYSTEM BY JOULE EFFECT

(75) Inventors: Gilles Chene, Toulouse (FR); Fabrice Gantie, Toulouse (FR); Alain Porte, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 336 days.

(21) Appl. No.: 12/515,035

(22) PCT Filed: Nov. 13, 2007

(86) PCT No.: PCT/FR2007/052333
§ 371 (c)(1), (2), (4) Date: May 15, 2009

(87) PCT Pub. No.: WO2008/059168
PCT Pub. Date: May 22, 2008

(65) Prior Publication Data
US 2010/0301161 A1 Dec. 2, 2010

(30) Foreign Application Priority Data
Nov. 16, 2006 (FR) ..................................... 06 54928

(51) Int. Cl.
*B64C 1/40* (2006.01)
*B64C 23/40* (2006.01)
*B64D 15/00* (2006.01)
(52) U.S. Cl. .................. 244/1 N; 244/53 B; 244/134 R
(58) Field of Classification Search .............. 244/134 R, 244/1 N, 53 B, 134 D, 134 A
See application file for complete search history.

(56) References Cited

U.S. PATENT DOCUMENTS

| 4,743,740 | A | * | 5/1988 | Adee | 219/548 |
| 6,439,340 | B1 | | 8/2002 | Shirvan | |
| 2001/0005937 | A1 | * | 7/2001 | Andre et al. | 29/888.01 |
| 2002/0078569 | A1 | * | 6/2002 | Buge et al. | 29/897.32 |
| 2005/0081992 | A1 | * | 4/2005 | Buge et al. | 156/308.4 |
| 2008/0083497 | A1 | * | 4/2008 | Dublineau et al. | 156/307.3 |
| 2008/0179448 | A1 | * | 7/2008 | Layland et al. | 244/1 N |

FOREIGN PATENT DOCUMENTS
EP 1 495 963 1/2005
WO 2006/136748 12/2006

OTHER PUBLICATIONS
International Search Report dated Aug. 12, 2008, from corresponding PCT application.

* cited by examiner

*Primary Examiner* — Timothy D Collins
*Assistant Examiner* — Joshua Huson
(74) *Attorney, Agent, or Firm* — Young & Thompson

(57) ABSTRACT

The invention relates to acoustic lining for an aircraft, which can cover a leading edge, such as an air inlet in the nacelle of a propulsion unit, said lining comprising: (i) from the inside outwards, a reflective layer (28), at least one cellular structure (30) and an acoustically resistive structure (32) having a pre-determined proportion of open surface; and (ii) at least one frost treatment system in the form of at least one heating layer (46) comprising open zones through which acoustic waves can pass, which co-operate at least partially with the open zones in the acoustically resistive structure. The invention is characterized in that the acoustically resistive structure (32) includes at least one structural layer (36) with openings (38) and in that said at least one heating layer (46) is disposed under the structural layer (36).

13 Claims, 7 Drawing Sheets

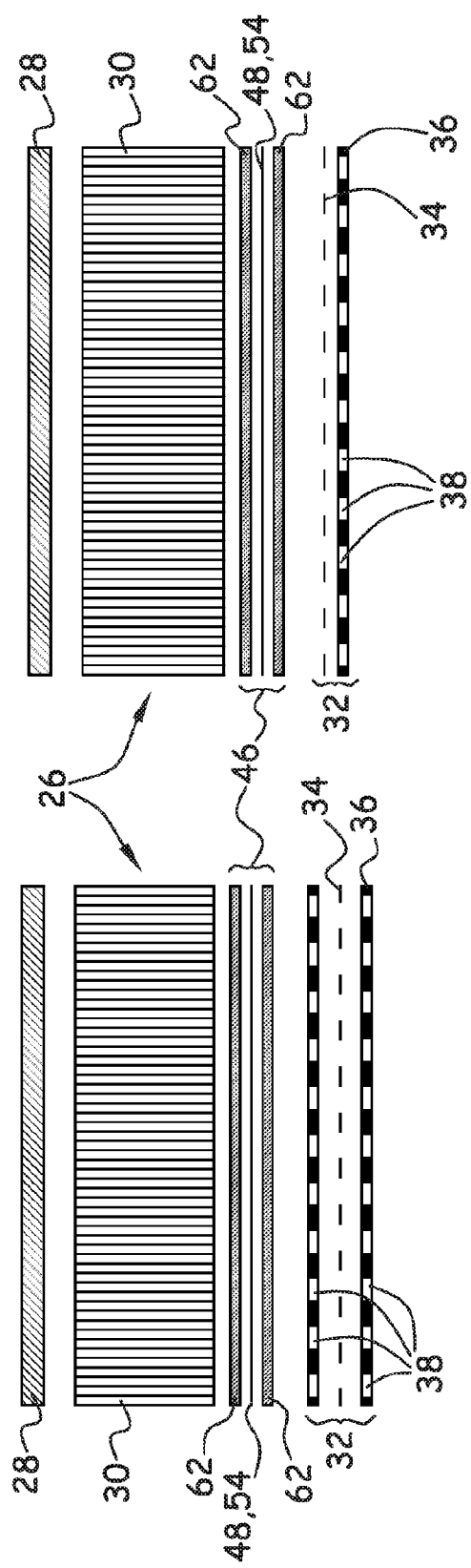

Figure 1:
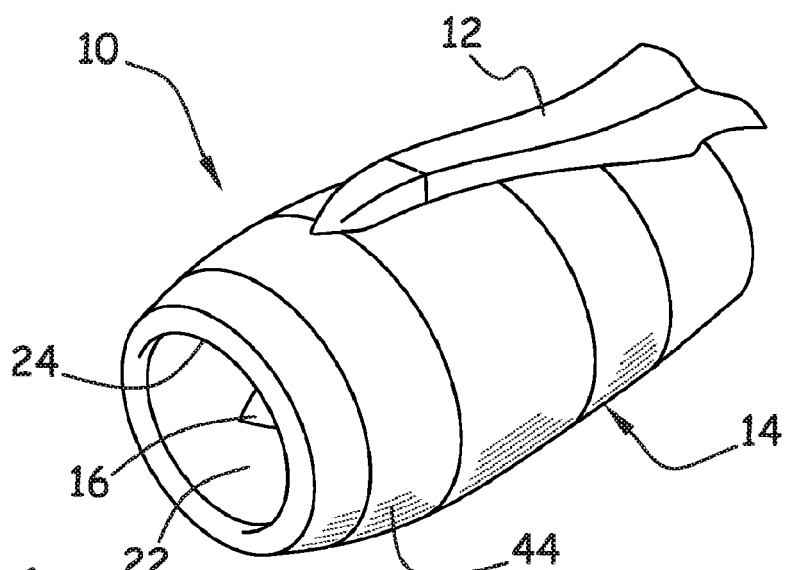

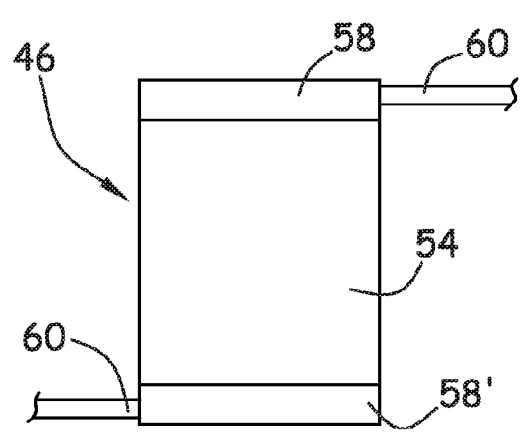
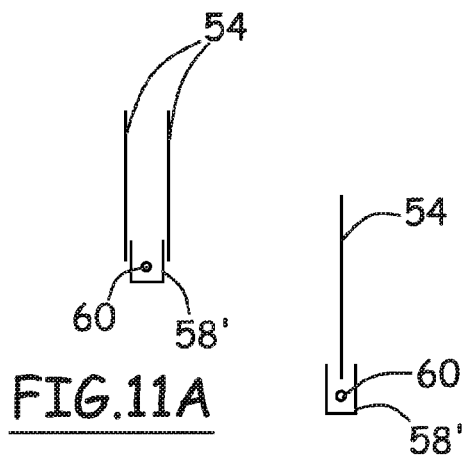
FIG.10  FIG.11A  FIG.11B
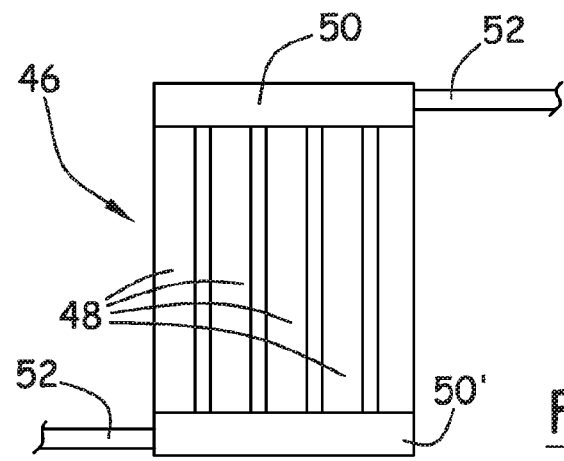
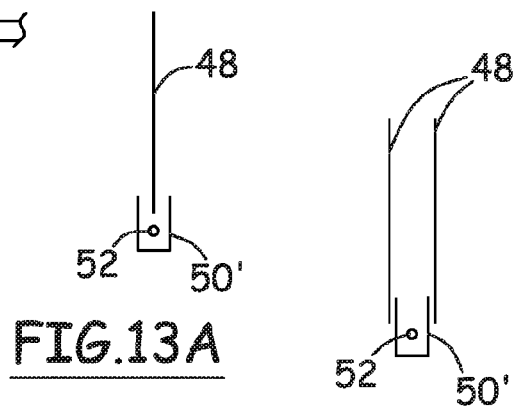
FIG.12  FIG.13A  FIG.13B
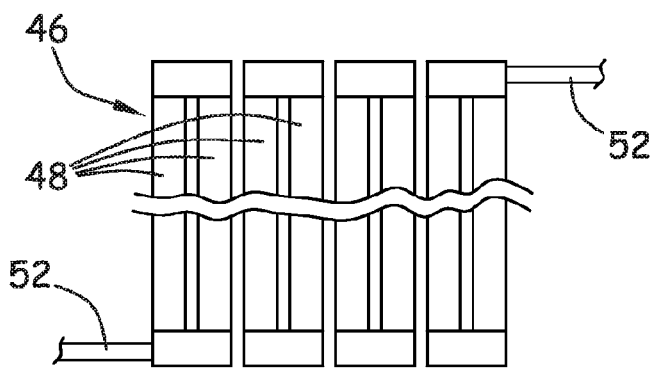
FIG.14

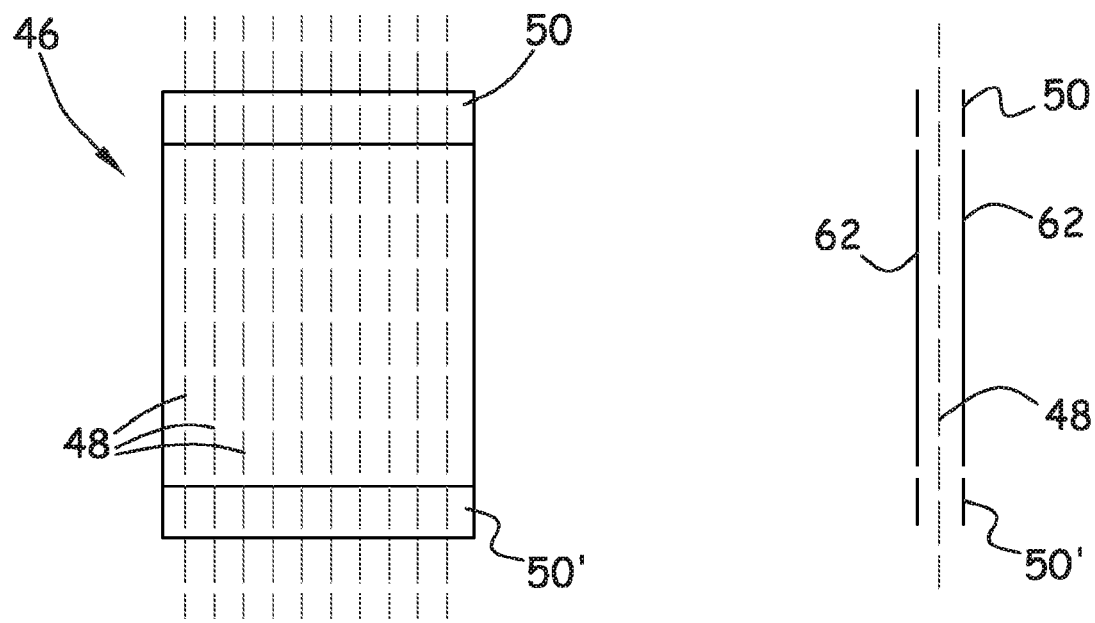
FIG.15
FIG.16
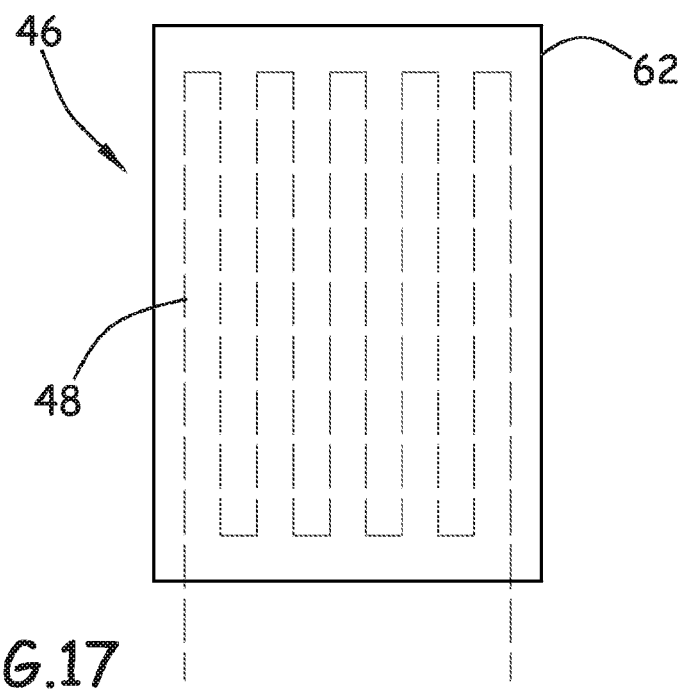
FIG.17

ACOUSTIC COATING FOR AN AIRCRAFT INCORPORATING A FROST TREATMENT SYSTEM BY JOULE EFFECT

BACKGROUND OF THE INVENTION

1. Field of the Invention

This invention relates to an acoustic coating for an aircraft incorporating a frost treatment system by Joule effect, whereby said coating is more particularly designed to cover the leading edges of an aircraft and more particularly an air intake of a nacelle of an aircraft.

2. Description of the Related Art

An aircraft propulsion unit comprises a nacelle in which a power plant that drives a fan mounted on its shaft is arranged essentially concentrically.

The nacelle comprises an inside wall that delimits a pipe with an air intake toward the front, a first portion of the entering air flow, called primary flow, passing through the engine to participate in the combustion, the second portion of the air flow, called secondary flow, being driven by the fan and flowing into an annular pipe that is delimited by the inside wall of the nacelle and the outside wall of the power plant.

The noise emitted by the propulsion unit consists, on the one hand, of jet noise, produced on the outside of the pipes as a result of the mixing of various air flows and exhaust gases, and, on the other hand, of noise generated by the inside parts, so-called internal noise, produced by the fan, the compressors, the turbines and the combustion that propagates inside the pipes.

To limit the impact of noise pollution close to the airports, the international standards are increasingly restrictive as far as sound emissions are concerned.

Techniques have been developed to reduce the internal noise, in particular by using, at the walls of the pipes, coatings whose purpose is to absorb a portion of the sound energy, in particular by using the principle of Helmholtz resonators. In a known way, this acoustic coating, also called an acoustic panel, comprises—from the inside to the outside—a reflective layer, at least one alveolar structure, and an acoustically resistive structure.

Layer is defined as one or more layers that may or may not be of the same type.

The acoustically resistive structure is a porous structure that has a dissipative role, partially transforming the acoustic energy of the sound wave that passes through it into heat. It comprises so-called open zones that are able to allow acoustic waves to pass and other so-called closed or filled zones that do not allow sound waves to pass but are designed to ensure the mechanical strength of said layer. This acoustically resistive layer is characterized in particular by an open surface ratio that varies essentially based on the engine and the components that constitute said layer.

For the moment, because of various constraints, for example shaping or compatibility with other equipment, coatings are provided in particular at the inside wall of the nacelle over a limited zone that is distant from the air intake and the air discharge.

To increase the effectiveness of the acoustic treatment, one approach consists in increasing the surface areas that are covered by the acoustic coating. However, at the air intake or on the lip of the nacelle, the installation of an acoustic coating is not possible for the moment in particular because said coating is not compatible with the systems that make it possible to prevent the formation and/or the accumulation of ice and/or frost that are necessary in these zones.

These systems are divided into two families, the first called defrosting systems that make it possible to limit the formation of ice and/or frost, the second called de-icing systems that limit the accumulation of ice and/or frost and act on both the ice and/or frost formed. Hereinafter, a frost treatment system is defined as a defrosting system or a de-icing system, whereby the term frost encompasses frost or ice.

For the defrosting treatment, one approach consists in treating the aircraft on the ground by using a gas or a liquid that is deposited on the surfaces to be treated. Even if these treatments are effective, in particular at the time of take-off, they have a limited duration. It is necessary, however, that frost treatment systems be put on board the aircraft because frost can form at the aerodynamic surface of the aircraft, and, more particularly, at the leading edges of the wing, the nacelle, the stabilizer, etc., when the aircraft passes through certain meteorological conditions.

SUMMARY OF THE INVENTION

This invention relates more specifically to an electrical-type defrosting system by Joule effect.

This frost treatment system consists in using electric resistors that are made of a conductive material that is covered by an insulator to heat the surface to be treated by the Joule effect. This type of system is not satisfactory because it is relatively fragile and susceptible to being damaged by bird strikes, hail or accidents during maintenance. In the damaged zones, the frost treatment system can no longer function, making possible the formation and the accumulation of ice or frost. Finally, it is not compatible with the coatings for the acoustic treatment because its presence on the surface generally changes the performance levels of the acoustic treatment.

The object of this invention is to remedy the drawbacks of the prior art by proposing an acoustic coating for an aircraft incorporating a frost treatment system that makes it possible to optimize the operation of each of the treatments.

For this purpose, the invention has as its object an acoustic coating for an aircraft, able to cover a leading edge, such as, for example, an air intake of a nacelle of a propulsion unit, said acoustic coating comprising, on the one hand—from the inside to the outside—a reflective layer, at least one alveolar structure, and an acoustically resistive structure that has a determined open surface ratio, and, on the other hand, at least one frost treatment system in the form of at least one heating layer that comprises open zones that are able to allow the passage of acoustic waves that cooperate at least in part with the open zones of the acoustically resistive structure, characterized in that the acoustically resistive structure comprises at least one structural layer with openings and in that said at least one heating layer is arranged under the structural layer.

This arrangement makes it possible to make the acoustic and frost treatments compatible.

Preferably, the acoustically resistive structure comprises a structural layer that comprises open zones, and the heating layer is arranged under said structural layer. According to this configuration, the frost treatment system is protected, which makes it possible to reduce the maintenance time and the down time on the ground of the aircraft.

BRIEF DESCRIPTION OF THE DRAWING FIGURES

Figure 2:
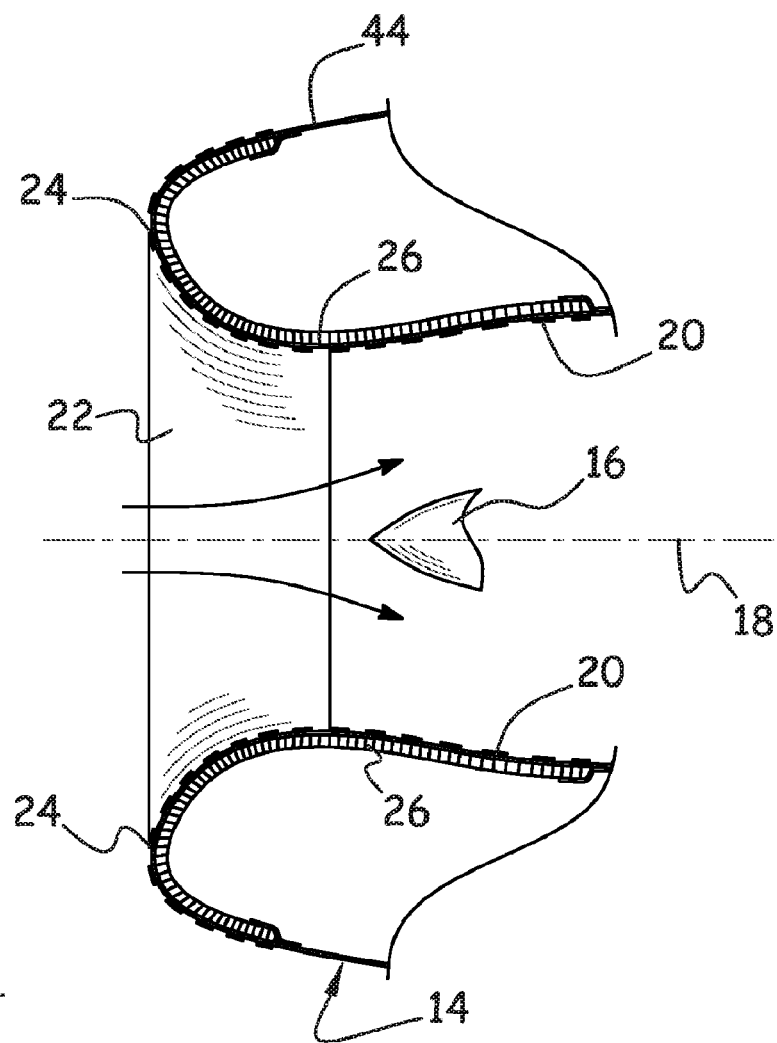
Figure 5:
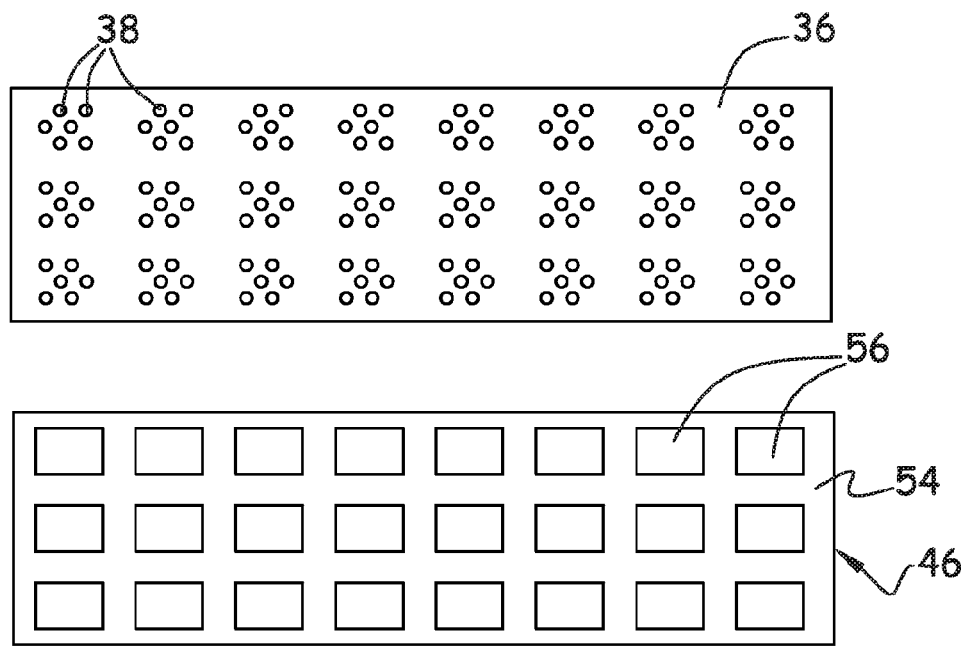
Figure 6:
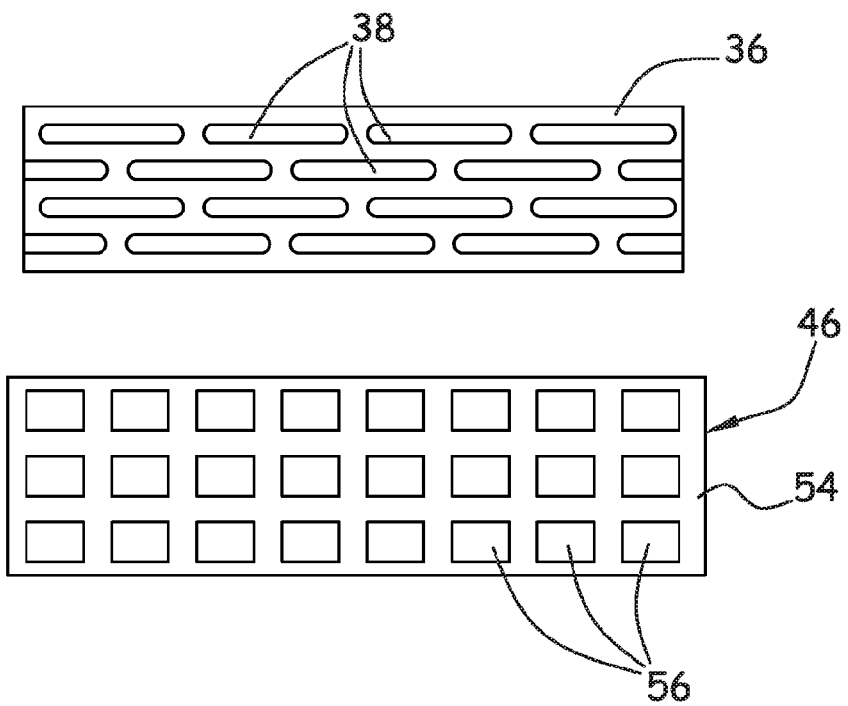
Figure 7:
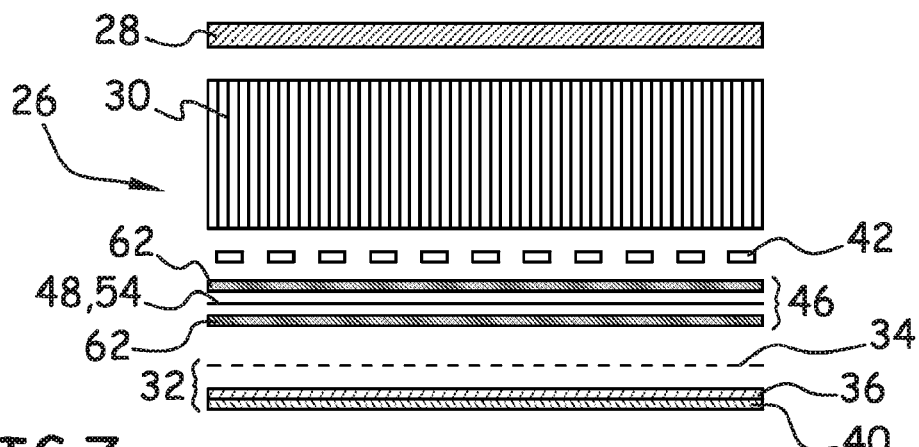
Figure 8:
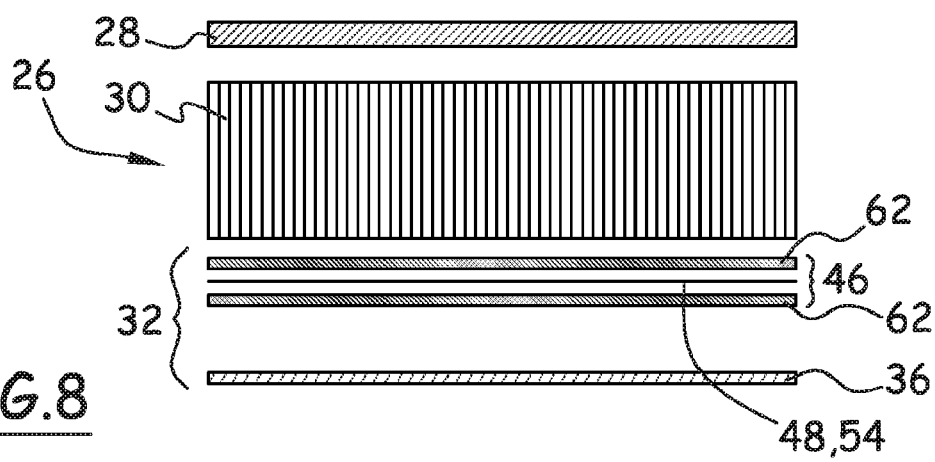
Figure 9:
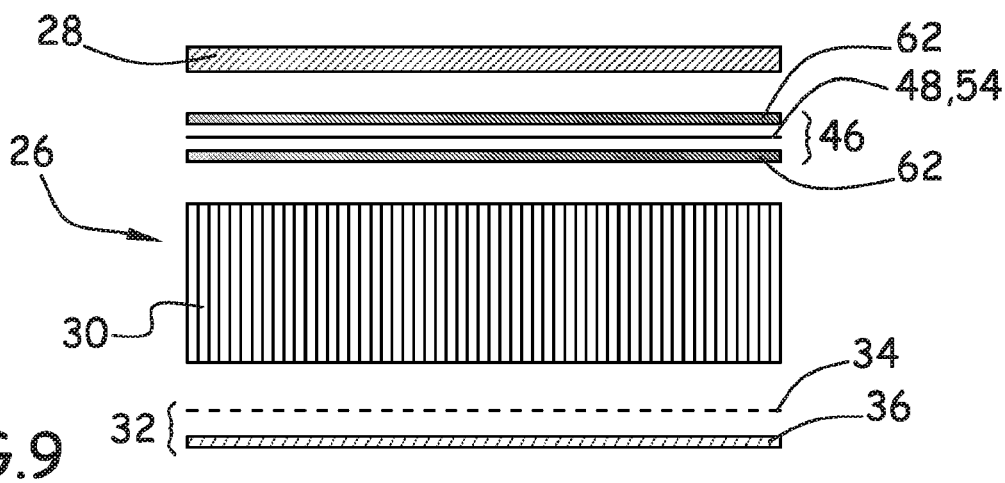
Figure 18:
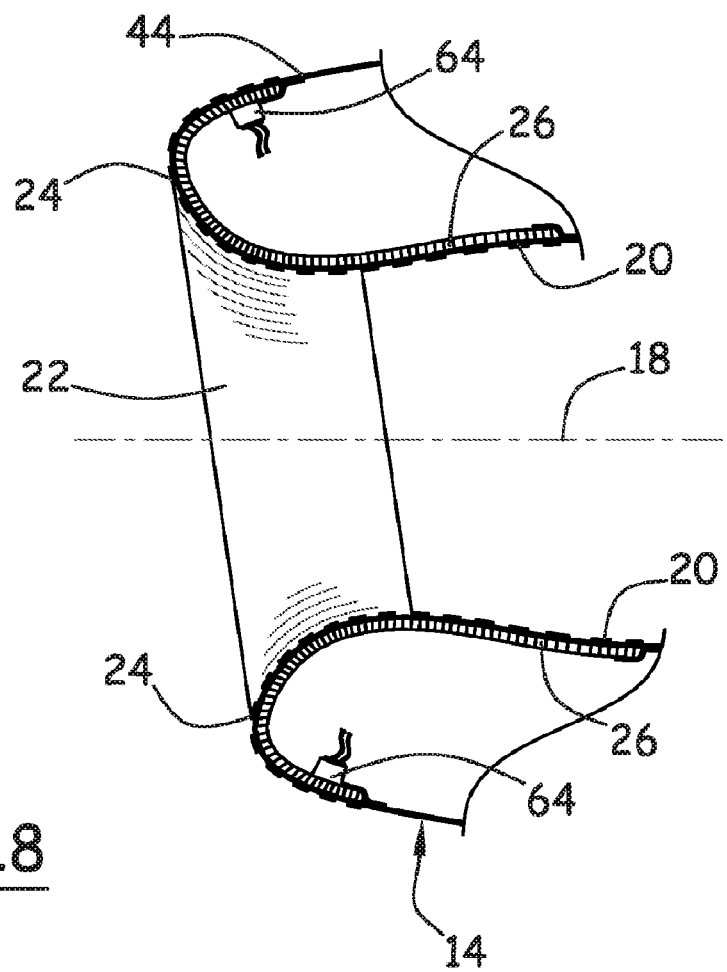
Figure 19:
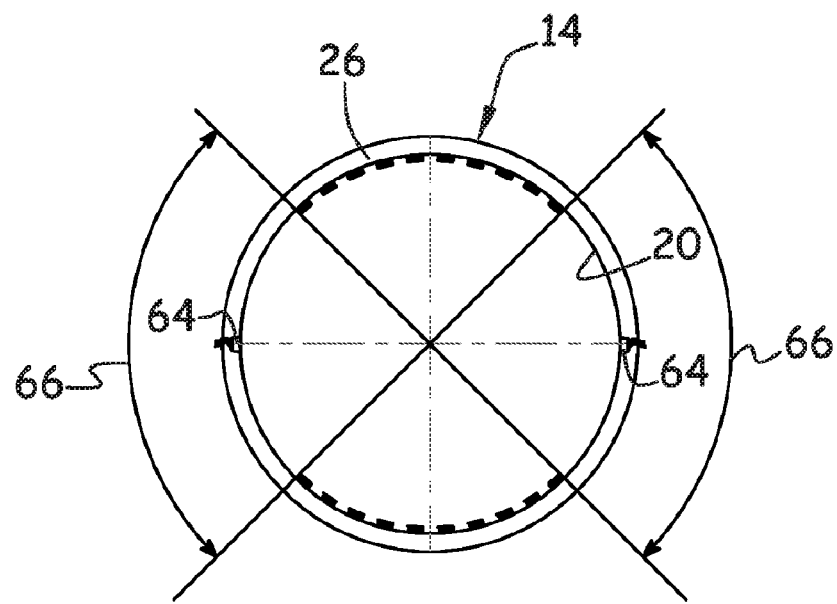

Other characteristics and advantages will emerge from the following description of the invention, a description that is provided only by way of example, with regard to the accompanying drawings in which:

FIG. 1 is a perspective view of a propulsion unit of an aircraft,

FIG. 2 is a longitudinal cutaway that illustrates an air intake of a nacelle according to the invention, FIG. 3A is a cutaway that illustrates the various layers of an acoustic coating that incorporates the function of frost treatment according to a first embodiment, FIG. 3B is a cutaway that illustrates the various layers of an acoustic coating that incorporates the function of frost treatment according to another embodiment, FIG. 4 is a view that illustrates the relative position of a conductive element of the frost treatment system and openings of the acoustically resistive layer, FIG. 5 is a view that illustrates, on the one hand, a variant of the openings of the acoustically resistive layer and, on the other hand, a variant of the heating layer, FIG. 6 is a view that illustrates, on the one hand, another variant of the openings of the acoustically resistive layer, and, on the other hand, another variant of the heating layer, FIG. 7 is a cutaway that illustrates another variant of an acoustic coating incorporating the function of frost treatment, FIG. 8 is a cutaway that illustrates another variant of an acoustic coating incorporating the function of frost treatment, FIG. 9 is a cutaway that illustrates another variant of an acoustic coating incorporating the function of frost treatment, FIG. 10 is a view that illustrates a first variant of the heating layer that ensures the function of frost treatment by Joule effect, FIG. 11a is a cutaway that illustrates a first embodiment of the variant of FIG. 10, FIG. 11b is a cutaway that illustrates another embodiment of the variant of FIG. 10, FIG. 12 is a view that illustrates another variant of the heating layer that ensures the function of frost treatment by Joule effect, FIG. 13A is a cutaway that illustrates a first embodiment of the variant of FIG. 12, FIG. 13B is a cutaway that illustrates another embodiment of the variant of FIG. 12, FIG. 14 is a view that illustrates another variant of the heating layer that ensures the function of frost treatment by Joule effect, FIG. 15 is a view that illustrates another variant of the heating layer that ensures the function of frost treatment by Joule effect, FIG. 16 is a cutaway of the heating layer of FIG. 15, FIG. 17 is a view that illustrates another variant of the heating layer that ensures the function of frost treatment by Joule effect, FIG. 18 is a longitudinal cutaway that illustrates the installation of various frost treatment systems at an air intake, and FIG. 19 is a cross-section that illustrates the installation of various frost treatment systems at an air intake.

DETAILED DESCRIPTION OF THE INVENTION

This invention is now described applied to an air intake of a propulsion unit of an aircraft. However, it can apply to various leading edges of an aircraft or to various surfaces of an aircraft where an acoustic treatment and a frost treatment are performed.

Hereinafter, frost is defined both as frost and ice, of all kinds, all structures and all thicknesses.

In FIG. 1, a propulsion unit 10 of an aircraft that is connected under the wing by means of a mast 12 is shown. However, this propulsion unit could be connected to other zones of the aircraft.

This propulsion unit comprises a nacelle 14 in which a power plant that drives a fan that is mounted on its shaft 16 is arranged essentially concentrically. The longitudinal axis of the nacelle is referenced 18.

The nacelle 14 comprises an inside wall 20 that delimits a pipe with an air intake 22 toward the front, a first portion of the entering air flow, called primary flow, passing through the power plant to participate in the combustion, the second portion of the air flow, called secondary flow, being driven by the fan and flowing into an annular pipe that is delimited by the inside wall 20 of the nacelle and the outside wall of the power plant.

The top part 24 of the air intake 22 describes an essentially circular shape that extends in a plane that can be essentially perpendicular to the longitudinal axis 18, as illustrated in FIG. 2, or not perpendicular, with the top part located just before 12 o'clock, as illustrated in FIG. 18. However, other air intake shapes can be considered.

Hereinafter, aerodynamic surface is defined as the shell of the aircraft that is in contact with the aerodynamic flow.

To limit the impact of pollution, a coating 26 whose purpose is to absorb a portion of the sound energy, in particular by using the principle of Helmholtz resonators, is provided in particular at the aerodynamic surfaces. In a known way, this acoustic coating, also called an acoustic panel, comprises—from the inside to the outside—a reflective layer 28, an alveolar structure 30, and an acoustically resistive structure 32.

As a variant, the acoustic coating can comprise several alveolar structures 30 that are separated by acoustically resistive layers called a septum.

According to one embodiment, the reflective layer 28 can come in the form of sheet metal or a skin that consists of at least one layer of woven or non-woven fibers that are embedded in a resin matrix.

The alveolar structure can come in the form of a metal honeycomb or composite material, for example a honeycomb structure that is marketed under the name NIDA NOMEX (honeycomb flame resistant meta-aramid polymer material).

The reflective layer and the alveolar structure are not presented in more detail because they are known to one skilled in the art.

The acoustically resistive structure 32 comprises at least one porous structure that has a dissipative role, partially transforming the acoustic energy of the sound wave that passes through it into heat.

According to one embodiment, the acoustically resistive structure can come in the form of at least one layer of woven or non-woven fibers, whereby the fibers are preferably coated by a resin to ensure the resumption of stresses in different directions of the fibers.

According to another embodiment, the acoustically resistive structure 32 comprises at least one porous layer 34 and at least one structural layer 36 imparting the required mechanical characteristics to the acoustically resistive structure.

The porous layer 34 can come in the form of, for example, a metal or non-metal material such as, for example, a wire mesh.

The structural layer 36 can come in the form of sheet metal or composite comprising on the surface openings 38 or microperforations that ensure the passage of acoustic waves through said structural layer. According to non-limiting embodiments, the structural layer 36 can come in the form of sheet metal or composite, for example, made of carbon fibers that are embedded in a resin, optionally reinforced by a glass-fiber-based reinforcement layer 40 for example, as illustrated in FIG. 7.

The structural layer 36 comprises openings 38 or microperforations of various shapes or sizes, for example oblong shapes as illustrated in FIGS. 4 and 6 or circular holes that are combined as illustrated in FIG. 5. The shapes and the sizes of the openings 38 are determined so as to reduce the disruption of the air flow, to ensure the required mechanical strength, in particular so as to withstand delamination, and to allow the passage of sound waves to impart a good yield to the acoustic coating.

Advantageously, the structural layer 36 is arranged on the outside, whereby the porous layer 34 is inserted between said structural layer 36 and the alveolar structure 30. This configuration makes it possible to protect the porous layer 34.

As a variant, the porous layer 34 can be arranged between two structural layers 36, as illustrated in FIG. 3A.

According to another embodiment, the coating can comprise at least one reinforcement, for example a winding of carbon fibers 42 inserted between the alveolar structure and the acoustically resistive structure, as illustrated in FIG. 7.

In all of the cases, the acoustically resistive structure 32 comprises so-called open zones that are able to allow acoustic waves to pass and other so-called closed or filled zones that do not allow acoustic waves to pass but are designed to ensure the mechanical strength of said layer. This acoustically resistive layer is characterized in particular by an open surface ratio that varies essentially based on the engine and components that constitute said layer.

As illustrated in FIGS. 2 and 18, to also reduce the noise pollution, the air intake 22 comprises an acoustic coating 26 on at least one portion of the aerodynamic surface.

According to one embodiment, this acoustic coating 26 extends from the inside wall 20 of the nacelle up to the top part 24 of the air intake over the entire periphery of the air intake. Preferably, as illustrated in FIGS. 2 and 18, the acoustic coating 26 extends beyond the top part 24 of the air intake and covers a portion of the outside surface 44 of the nacelle.

The installation of the acoustic coating is not presented in more detail because it is known to one skilled in the art.

To limit the formation of frost or to prevent its accumulation, at least one frost treatment system is provided at the air intake 22.

Hereinafter, frost treatment system is defined as a defrosting system or a de-icing system.

To be able to make the acoustic treatment and the frost treatment compatible and so that the operation of one does not impede the operation of the other, the frost treatment system is a frost treatment system by Joule effect in the form of at least one heating layer 46 that comprises open zones that are able to allow the passage of acoustic waves that cooperate at least in part with the open zones of the acoustically resistive structure so that the variation of the open surface ratio of the acoustically resistive layer is less than 35%.

Advantageously, the heating layer 46 is arranged under the structural layer 36 so as to be protected from external attacks such as bird strikes, hail or accidents during maintenance.

This configuration makes it possible to ensure a more reliable operation of the frost treatment system and to reduce the down time of the aircraft on the ground to the extent that the risks of being damaged are more limited.

As illustrated in FIG. 9, the heating layer can be arranged between the reflective layer 28 and the alveolar structure 30. However, this variant is less capable because the heating layer is further removed from the surface to be treated, the aerodynamic layer on which frost is likely to form.

According to another variant, the heating layer 46 can also ensure the function of acoustically resistive layer, as illustrated in FIG. 8. In this case, the heating layer 46 comprises porous zones that are able to allow the acoustic waves to pass.

According to a first variant that is illustrated in FIGS. 4, 12, 14, 16 and 17, the structure that is acoustically resistive to open zones that are arranged so as to create approximately linear filled zones and the heating layer comprises at least one flat linear conductive element 48 whose width is less than or equal to the width of the filled zones of the structural layer 36 as illustrated in FIG. 4.

The fact of providing flat linear conductive elements 48 makes it possible to reduce the thickness of the heating layer and not to alter the operation of the acoustic coating.

Furthermore, the fact that the conductive elements 48 of the heating layer do not encroach upon the openings 38 of the structural layer makes it possible to not modify the open surface ratio of the acoustically resistive structure 32. In addition, this arrangement makes it possible to reduce the risks of being damaged to the extent that the conductive elements 48 are covered and protected by the structural layer 36.

If appropriate, the heating layer can comprise a single linear conductive element 48 in coil form extending over the entire zone to be treated, as illustrated in FIG. 17, or several linear conductive elements 48 that are connected according to an assembly in series as illustrated in FIG. 14, or according to an assembly in parallel, as illustrated in FIGS. 12 and 15.

According to a first embodiment, the linear conductive elements 48 connect two electrodes or grids 50, 50'. Each U-shaped grid is connected to a power supply wire 52 that is placed between the branches of the U. According to a first approach, the conductive elements 48 are placed between the branches of the U as illustrated in FIG. 13A. According to another approach, the linear conductive elements are arranged in pairs, whereby a conductive element 48 is provided for each branch of the U, as illustrated in FIG. 13B.

According to a second variant that is illustrated in FIGS. 5, 6 and 10, the heating layer comprises at least one conductive sheet 54 that comprises openings 56 that are able to allow the passage of the acoustic waves that cooperate at least in part with the open zones of the acoustically resistive structure such that the variation of the open surface ratio of the acoustically resistive layer is reduced.

According to a first embodiment that is illustrated in FIG. 5, the filled (not open) zones of the heating layer do not encroach on the open zones of the acoustically resistive layer and more particularly with the openings of the structural layer.

According to another embodiment that is illustrated in FIG. 6, the intermediate zones that are provided between the openings that are made at the heating layer are very small, although the open surface of the structural layer that is blocked by said intermediate zones is very small.

The fact of providing a conductive element in the form of a sheet makes it possible to reduce the thickness of the heating layer and to reduce the disruptions in the acoustic treatment.

Furthermore, the fact of providing a conductive element in sheet form makes it possible to limit the risks of propagation of the defective zone in the case of point-type damage.

Finally, whereby the visible layer is protected by the structural layer and the visible zones of the heating layer via the openings of the structural layer are small, the risks of deterioration of the heating layer are reduced.

According to a first technical approach that is illustrated in FIG. 11A, the heating layer comprises two superposed conductive sheets 54, stretched between two electrodes or grids 58, 58' in the shape of a U, whereby a power supply wire 60 is placed between the branches of the U of each electrode 58, 58'.

According to another technical approach that is illustrated in FIG. 11B, the heating layer comprises a conductive sheet 54 that is stretched between two electrodes or grids 58, 58' in the shape of a U, whereby a power supply wire 60 is placed between the branches of the U of each electrode 58, 58'.

According to another characteristic of the invention, the heating layer comprises at least one insulating element 62 that coats the conductive element(s).

According to the variants, the heating layer can comprise two insulating skins 62 that are arranged on both sides of the conductive element(s), whereby said skins have open zones that correspond to the open zones of the heating layer.

According to another characteristic of the invention, the frost treatment system by Joule effect that is shown in dotted lines in FIGS. 2 and 18 can be combined with other frost treatment systems, in particular of the point type in the form of at least one vibration emitter 64.

Thus, the vibration emitters 64 are arranged at the outside surface 44 of the nacelle, as illustrated in FIG. 18, and/or inside the nacelle at the angular sectors 66 that extend from approximately 2 o'clock to approximately 4 o'clock and from approximately 8 o'clock to approximately 10 o'clock, as illustrated in FIG. 9.

Thus, the vibration emitters 64 that have a relatively low energy consumption are arranged at the outside surface because the risks that an ice fragment from this zone will be ingested by the power plant are limited Likewise, the formation of ice or frost is limited to the interior of the nacelle at angular sectors that are referenced 66, so that a vibration emitter can be used by frequency sweeping.

Because the frost or the ice has a tendency to form more significantly in the zones that are provided inside the nacelle between the angular sectors 66 and in order to limit the risks of the power plant's ingestion of large fragments, an electric-type frost treatment system with Joule effect, whose operation is more reliable and that prevents the formation of frost or ice, even if this type of frost treatment system has a higher energy consumption, will be used in these zones.

This combination of various frost treatment systems makes it possible to optimize the treatment by limiting the energy consumption, while having a reliable and effective operation.

The invention claimed is:

1. An acoustic coating for an aircraft, able to cover a leading edge, or an air intake (22) of a nacelle (14) of a propulsion unit (10), said acoustic coating comprising:
   from an inside to an outside—
   a reflective layer (28),
   at least one alveolar structure (30),
   and an acoustically resistive structure (32) that comprises at least one porous layer (34) and at least one structural layer (36) with openings (38), said at least one structural layer (36) being arranged outside and constituting an aerodynamic surface; and
   at least one frost treatment system having at least one heating layer (46),
   wherein the openings (38) of the structural layer are arranged so as to create linear filled zones, said at least one heating layer (46) is arranged under the structural layer (36) between the openings of said structural layer and comprises at least one flat linear conductive element (48) whose width in a plane parallel to the aerodynamic surface is less than or equal to a width of filled zones of the structural layer (36) so as to not encroach upon the openings (38) of the structural element (36) and to not modify an open surface ratio of the acoustically resistive structure (32).

2. The acoustic coating according to claim 1, wherein the heating layer (46) comprises a linear conductive element in coil shape that extends over the zone to be treated.

3. The acoustic coating according to claim 2, wherein the heating layer (46) comprises at least one insulating element (62) that coats the conductive element(s) (48).

4. The acoustic coating according to claim 1, wherein the heating layer (46) comprises several linear conductive elements (48) that are connected according to an assembly in series.

5. The acoustic coating according to claim 4, wherein the heating layer (46) comprises at least one insulating element (62) that coats the conductive element(s) (48).

6. The acoustic coating according to claim 1, wherein the heating layer (46) comprises several linear conductive elements (48) that are connected according to an assembly in parallel.

7. The acoustic coating according to claim 6, wherein the heating layer (46) comprises at least one insulating element (62) that coats the conductive element(s) (48).

8. The acoustic coating according to claim 1, wherein the heating layer comprises at least one conductive sheet (54) that comprises openings (56) that are able to allow the passage of acoustic waves that cooperate at least in part with the open zones of the acoustically resistive structure, such that the variation of the open surface ratio of the acoustically resistive layer is reduced.

9. The acoustic coating according to claim 8, wherein the heating layer (46) comprises at least one insulating element (62) that coats the conductive element(s) (48).

10. The acoustic coating according to claim 1, wherein the heating layer (46) comprises at least one insulating element (62) that coats the conductive element(s) (48).

11. An air intake (22) of a nacelle (14) of an aircraft propulsion unit (10), covered at least in part by a coating (26) for an acoustic treatment that comprises:
    from an inside to an outside—
    a reflective layer (28),
    at least one alveolar structure (30), and an acoustically resistive structure (32) that comprises at least one porous layer (34) and at least one structural layer (36) with openings (38), said at least one structural layer (36) being arranged outside and constituting an aerodynamic surface; and
    at least one frost treatment system having at least one heating layer (46),
    wherein the openings (38) of the structural layer are arranged so as to create linear filled zones, said at least one heating layer (46) is arranged under the structural layer (36) between the openings of said structural layer and comprises at least one flat linear conductive element (48) whose width in a plane parallel to the aerodynamic surface is less than or equal to a width of filled zones of the structural layer (36) so as to not encroach upon the openings (38) of the structural element (36) and to not modify an open surface ratio of the acoustically resistive structure (32).

12. The air intake of a nacelle (14) of an aircraft propulsion unit (10) according to claim 11, wherein the heating layer (46) comprises several linear conductive elements (48) that are connected according to an assembly in parallel.

13. The air intake of a nacelle (14) of an aircraft propulsion unit (10) according to claim 11, wherein the heating layer (46) comprises at least one insulating element (62) that coats the conductive element(s) (48).

* * * * *